US008647745B2

(12) United States Patent
Lucas

(10) Patent No.: US 8,647,745 B2
(45) Date of Patent: Feb. 11, 2014

(54) POWDER COATING COMPOSITIONS HAVING A SUBSTANTIALLY NON-ZINC CONTAINING PRIMER

(75) Inventor: Chad Lucas, Newburgh Heights, OH (US)

(73) Assignee: Akzo Nobel Coating International B.V., Arnhem (NL)

( * ) Notice: Subject to any disclaimer, the term of this patent is extended or adjusted under 35 U.S.C. 154(b) by 219 days.

(21) Appl. No.: 12/864,050

(22) PCT Filed: Jan. 23, 2009

(86) PCT No.: PCT/EP2009/050738
§ 371 (c)(1),
(2), (4) Date: Jul. 22, 2010

(87) PCT Pub. No.: WO2009/092773
PCT Pub. Date: Jul. 30, 2009

(65) Prior Publication Data
US 2010/0297422 A1 Nov. 25, 2010

Related U.S. Application Data

(60) Provisional application No. 61/023,540, filed on Jan. 25, 2008.

(30) Foreign Application Priority Data

Feb. 21, 2008 (EP) .................... 08003475

(51) Int. Cl.
*B32B 15/092* (2006.01)
*B32B 15/09* (2006.01)
*C09D 5/03* (2006.01)
*C09D 163/00* (2006.01)
*C09D 167/00* (2006.01)

(52) U.S. Cl.
USPC ........... 428/418; 428/416; 428/480; 525/523; 525/534; 523/427; 523/440; 523/443; 523/457; 523/458; 523/466

(58) Field of Classification Search
USPC .......... 428/413, 414, 416, 418, 480; 523/400, 523/427, 440, 443, 457, 458, 459, 466; 525/523, 524, 534
See application file for complete search history.

(56) References Cited

U.S. PATENT DOCUMENTS

| | | |
|---|---|---|
| 3,170,890 A | 2/1965 | Boyd et al. |
| 3,245,925 A | 4/1966 | Watson |
| 3,336,251 A | 8/1967 | Manasia |
| 3,756,984 A | 9/1973 | Klaren et al. |
| 3,769,069 A | 10/1973 | Sawyer |
| 3,817,946 A | 6/1974 | Ree |
| 3,860,557 A | 1/1975 | Millar et al. |
| 3,874,883 A | 4/1975 | Robitaille et al. |
| 3,884,705 A | 5/1975 | Blair |
| 3,947,522 A | 3/1976 | Shelley, Jr. et al. |
| 4,186,036 A | 1/1980 | Elms et al. |
| 4,237,037 A | 12/1980 | Takahashi |
| 4,313,837 A | 2/1982 | Vukasovich et al. |
| 4,316,939 A | 2/1982 | Guyomard |
| 4,345,004 A | 8/1982 | Miyata et al. |
| 4,381,334 A | 4/1983 | Balk et al. |
| 4,491,554 A | 1/1985 | Hamel et al. |
| 4,572,868 A | 2/1986 | Hosaka et al. |
| 4,581,293 A | 4/1986 | Saunders |
| 4,804,581 A | 2/1989 | Geary et al. |
| 4,933,382 A | 6/1990 | Kitagawa et al. |
| 5,030,285 A | 7/1991 | Vallvey et al. |
| 5,062,284 A | 11/1991 | Kubo et al. |
| 5,063,095 A | 11/1991 | Kitagawa et al. |
| 5,091,242 A | 2/1992 | Chung |
| 5,097,006 A | 3/1992 | Kapilow et al. |
| 5,137,567 A | 8/1992 | Vallvey et al. |
| 5,196,261 A | 3/1993 | Ono et al. |
| 5,248,400 A | 9/1993 | Franks et al. |
| 5,264,503 A | 11/1993 | Marx |
| 5,274,006 A | 12/1993 | Kagoshima et al. |
| 5,334,631 A | 8/1994 | Durand |

(Continued)

FOREIGN PATENT DOCUMENTS

| | | |
|---|---|---|
| CA | 1120253 | 3/1982 |
| CN | 1198690 A | 11/1998 |
| CN | 10103364 A | 9/2007 |
| CN | 101952374 A | 1/2011 |
| DE | 3018765 A1 | 11/1981 |
| DE | 10020481 A1 | 10/2001 |
| EP | 0 040 243 B1 | 11/1981 |
| EP | 0 440 292 A3 | 8/1991 |
| EP | 0 500 009 A1 | 8/1992 |
| EP | 0 525 870 A1 | 2/1993 |

(Continued)

OTHER PUBLICATIONS

Machine translation of JP 2000190422 A, provided by the JPO website (no date).*

(Continued)

*Primary Examiner* — Michael J Feely
(74) *Attorney, Agent, or Firm* — James C. Abruzzo

(57) ABSTRACT

Corrosion and chip-resistant coatings for high tensile steel components, such as automotive coil springs, are formed from a coating composition comprising a substantially non-zinc containing primer and a topcoat. The primer includes an epoxy resin having an epoxy equivalent weight of about 860 to about 930, a polyhydroxyl functional phenolic curing agent having a hydroxyl equivalent weight of about 200 to about 500, and a filler material. The topcoat includes an epoxy resin having an epoxy equivalent weight of about 520 to about 930, an elastomer-modified epoxy resin having an epoxy equivalent weight of about 1000 to about 1600, a carboxyl functional polyester with an acid number of about 45 to about 75 mg KOH/g, a foaming agent and a reinforcing fiber.

21 Claims, No Drawings

(56) References Cited

U.S. PATENT DOCUMENTS

| | | | |
|---|---|---|---|
| 5,338,347 A | 8/1994 | Rohr et al. | |
| 5,342,885 A | 8/1994 | St. Clair | |
| 5,461,112 A | 10/1995 | Masse et al. | |
| 5,468,461 A | 11/1995 | Hosoda et al. | |
| 5,562,989 A | 10/1996 | Statz | |
| 5,569,687 A | 10/1996 | Sanborn et al. | |
| 5,614,323 A | 3/1997 | Chang | |
| 5,677,367 A | 10/1997 | Savin | |
| 5,686,185 A | 11/1997 | Correll et al. | |
| 5,789,482 A | 8/1998 | Eldin et al. | |
| 5,789,498 A | 8/1998 | Ohnishi et al. | |
| 5,981,086 A | 11/1999 | Siminski | |
| 6,022,927 A | 2/2000 | Decker et al. | |
| 6,025,438 A | 2/2000 | Hinterwaldner et al. | |
| 6,069,221 A | 5/2000 | Chasser et al. | |
| 6,184,311 B1 | 2/2001 | O'Keeffe et al. | |
| 6,254,751 B1 | 7/2001 | Reiter et al. | |
| 6,284,846 B1 * | 9/2001 | Ambrose et al. | 525/440.02 |
| 6,294,610 B1 | 9/2001 | Daly et al. | |
| 6,346,292 B1 | 2/2002 | Grubb et al. | |
| 6,403,222 B1 | 6/2002 | Harrison | |
| 6,521,706 B1 | 2/2003 | Desai et al. | |
| 6,537,610 B1 | 3/2003 | Springer et al. | |
| 6,663,968 B2 | 12/2003 | Grubb et al. | |
| 6,677,032 B1 | 1/2004 | Grubb et al. | |
| 6,770,702 B1 | 8/2004 | Muller et al. | |
| 7,018,716 B2 | 3/2006 | Grubb et al. | |
| 7,244,780 B1 | 7/2007 | Robinson et al. | |
| 7,473,717 B2 | 1/2009 | Muenz et al. | |
| 2001/0046555 A1 | 11/2001 | Lessmeister et al. | |
| 2001/0051227 A1 | 12/2001 | Jung et al. | |
| 2003/0124248 A1 | 7/2003 | Tullos et al. | |
| 2004/0009300 A1 | 1/2004 | Shimakura et al. | |
| 2004/0101670 A1 | 5/2004 | Grubb et al. | |
| 2004/0266899 A1 | 12/2004 | Muenz et al. | |
| 2007/0116963 A1 | 5/2007 | Sakakibara | |
| 2007/0172665 A1 | 7/2007 | Kunita et al. | |
| 2009/0110934 A1 | 4/2009 | Cinoman et al. | |
| 2009/0176903 A1 * | 7/2009 | Muenz et al. | 521/91 |
| 2009/0270533 A1 | 10/2009 | Umehara et al. | |
| 2010/0256282 A1 | 10/2010 | Breidenstein et al. | |
| 2010/0297422 A1 | 11/2010 | Lucas | |

FOREIGN PATENT DOCUMENTS

| | | |
|---|---|---|
| EP | 0 292 771 B1 | 3/1993 |
| EP | 0 631 536 B1 | 12/1996 |
| EP | 0 846 710 A1 | 6/1998 |
| EP | 0 882 101 B1 | 12/1998 |
| EP | 1 165 712 B1 | 1/2002 |
| EP | 1 726 621 A1 | 5/2005 |
| EP | 1 972 672 A2 | 3/2008 |
| GB | 1 407 851 | 9/1975 |
| GB | 1 565 379 | 4/1980 |
| JP | 49-039625 | 4/1974 |
| JP | 58-114766 | 7/1983 |
| JP | A-58-114767 | 7/1983 |
| JP | 58-168619 | 10/1983 |
| JP | 59-29154 | 2/1984 |
| JP | 59-193970 | 11/1984 |
| JP | 61-148274 | 7/1986 |
| JP | 3-785 A | 1/1991 |
| JP | 3-170523 A | 7/1991 |
| JP | 6-9903 | 1/1994 |
| JP | 6-329955 | 11/1994 |
| JP | 7-26119 A | 1/1995 |
| JP | A-07-216297 | 8/1995 |
| JP | 8-10686 | 1/1996 |
| JP | 9-12926 A | 1/1997 |
| JP | 9-272820 | 10/1997 |
| JP | 11-188309 | 7/1999 |
| JP | 2000-143938 A | 5/2000 |
| JP | A-2000-176373 | 6/2000 |
| JP | 2000190422 A * | 7/2000 |
| JP | 2002-105393 | 4/2002 |
| JP | 2003-286435 A | 10/2003 |
| JP | 2004-352994 | 12/2004 |
| JP | 2006-96905 A | 4/2006 |
| JP | 2006-96928 A | 4/2006 |
| JP | 4020557 | 10/2007 |
| JP | 2007-313475 | 12/2007 |
| JP | 2007-314762 | 12/2007 |
| JP | A-2007-314712 | 12/2007 |
| WO | WO 91/14745 | 10/1991 |
| WO | WO 92/11324 | 7/1992 |
| WO | WO 93/17851 | 9/1993 |
| WO | WO 00/55268 | 9/2000 |
| WO | WO 03/093375 A1 | 11/2003 |
| WO | WO 2005/028580 A2 | 3/2005 |
| WO | WO 2006/005136 A1 | 1/2006 |
| WO | WO 2006/038491 A1 | 4/2006 |
| WO | WO 2007/025007 A1 | 3/2007 |
| WO | WO 2007/138396 A1 | 12/2007 |
| WO | WO 2009/129088 A1 | 10/2009 |
| WO | WO 2011/012627 A2 | 2/2011 |

OTHER PUBLICATIONS

European Search Report for European Application No. 08003475.4 dated Jul. 2, 2008.
International Preliminary Report on Patentability for International Application No. PCT/EP2009/050738 dated Feb. 8, 2010.
International Search Report for International Application No. PCT/EP2009/050738 dated May 8, 2009.
Written Opinion for International Application No. PCT/EP2009/050738 dated May 8, 2009.
Abstract of JP 3-785 A dated Jan. 7, 1991 from Questel QPAT.
Abstract of JP 3-170523 A dated Jul. 24, 1991 from Questel QPAT.
Abstract of JP 7-26119 A dated Jan. 27, 1995 from Questel QPAT.
Abstract of JP 9-12926 A dated Jan. 14, 1997 from Questel QPAT.
Abstract of JP 2000-143938 A dated May 26, 2000 from Questel QPAT.
Abstract of JP 2003-286435 A dated Oct. 10, 2003 from Questel QPAT.
Abstract of JP2006-96928 A dated Apr. 13, 2006 from Questel QPAT.
Abstract of JP 2006-96905 A dated Apr. 13, 2006 from Questel QPAT.
Written Opinion for International Application No. PCT/EP2010/0060907, dated Mar. 22, 2011.
Fox in Bull. Amer. Physics. Soc., 1, 3, pp. 122-123 (1956).
Powder Coatings, "Elastomer-Modified Epoxy Powder Coatings: a Review," vol. 184, No. 4347, pp. 151-154 (Apr. 12, 1994).
Dow Chemical Company in Polymer Reprints, 32 (3), pp. 358-359 by H-J Sue and E. I. Garcia-Melfin (Aug. 1991).
Derwent Abstract of JP 58-114766 A.
Derwent Abstract of JP 59-029154 A.
English Translation for German Patent No. DE 10020481 A1.
English translation of JP Office Action for Patent Application No. 2008-208848 dated Oct. 5, 2011.
English translation of Chinese Office Action dated Jan. 31, 2011.
English translation of Chinese Office Action dated Dec. 15, 2011.
English translation of Japanses Office Action dated Jul. 24, 2012.
English Abstract of JP 2002-105393.
English Abstract of JP 2007-314762.
Alger, Polymer Science Dictionary, 2nd Edition, pp. 5-6, Apr. 1999.
Encyclopedia of Polymer Science and Engineering, vol. 3, Coating Methods: Powder Coating pp. 552, 575-577.
Encyclopedia of Polymer Science and Engineering, vol. 6, Epoxy Resins: Fillers, pp. 362-363, 1985.
H.J. Sue, et al., "Toughening of High Performance Epoxies Using Designed Core-Shell Rubber Particles", Polymer Reprints, 32 (3), pp. 358-359, (1991).
NERAC (computerized literature search) performed by Jeffrey Casavant, Sep. 29, 1998.
Shell Chemicals Systems & Solutions Newsletter, Jul. 2000—see p. 2.
General Motors Published Test, Chip Resistance of Coating, Jul. 1991.

(56) References Cited

OTHER PUBLICATIONS

General Motors Published Test, Scab Corrosion Creepback of Elpo Paint Systems on Metal Substrates, Oct. 1986.
General Motors Published Test, CASS—Copper Accelerated Acetic Acid Salt Spray Test, Nov. 1988.
GCA Newsletter, "Kukdo's New Products" (Relates to KR-600 series Acrylic Rubber Modified Epoxy), ( 2000).
Jianghai et al., "Polymer Wax and the Use thereof in Powder Coatings," English Translation, pp. 1-5.
Ralph Drake, "Elastomer-Modified Epoxy Powder Coatings: A Review", Powder Coatings, 184 No. 4347, Apr. 13, 1994, pp. 151-154.
Rothenberg, "Paint Additives, Recent Developments" pp. 175-177.
Derwent English Abstract for JP Publication No. 06-329955.
Derwent English Abstract for JP Publication No. 49-039625.
Derwent English Abstract for JP Publication No. 58-168619.
Derwent English Abstract for JP Publication No. 59-193970.
Derwent English Abstract for JP Publication No. 58-114766.
QPatent English Abstract for Chinese Patent Publication 101033364 A.
Orbit English Machine Translation for JP Publication No. 11-188309.
Orbit English Machine Translation for JP Publication No. 9-272820.
Orbit English Abstract for JP Publication No. 61-148274.
QPatent English Abstract for JP Patent Publication 6-009903 A.
QPatent English Abstract for JP Patent Publication 8-010686 A.
QPatent English Abstract for JP Patent Publication 2004-352994 A.
Derwent English Abstract for JP Publication No. 4020557.
Dow Epoxy Powder Coatings: Hardeners Oct. 2001—see p. 2.
English Abstract for Japanese Publication No. 07-216297; Publication Date Aug. 15, 1995.
English Abstract for Japanese Publication No. 58-114767; Publication Date Jul. 8, 1983.
English Abstract for Japanese Publication No. 2000-176373; Publication Date Jun. 27, 2000.
English Translation of Japanese Office Action mailed 7-16-20013 for Patent Application No. 2012-522155.
English Translation of Chinese Office Action mailed 7-26-20013 for Patent Application No. 201080032749.4.

\* cited by examiner

POWDER COATING COMPOSITIONS HAVING A SUBSTANTIALLY NON-ZINC CONTAINING PRIMER

CROSS-REFERENCE TO RELATED APPLICATIONS

This is an national stage application, under 35 U.S.C 371, of International Application No. PCT/EP09/50738, filed Jan. 23, 2009, which claims benefit of U.S. Application No. 61/023,540, filed Jan. 25, 2008, and EP Application No. 08003475.4, filed Feb. 21, 2008, the contents of each of which are incorporated herein by reference.

BACKGROUND OF THE INVENTION

1. Field of the Invention

The invention relates to a corrosion and chip resistant coating compositions for highly stressed steel such as automotive springs, and to highly stressed steel coated with the coating compositions.

2. Description of the Related Art

Compositions for coating steel are generally well known in the art.

U.S. Pat. No. 5,334,631 discloses a coating composition comprising an epoxy resin, a curing agent, lamellar zinc and zinc dust. A second layer may be applied as a topcoat coating, such as a powder coating composition based on a polyester resin as a binder and an epoxy group containing component, such as trisglycidylisocyanurate, as a curing agent. Stated applications for this coating are metals such as iron, steel, copper and aluminum, with examples showing use on the outside of a gas tank.

U.S. Pat. No. 7,018,716 discloses a coating comprising an epoxy resin that contains zinc, either as a single coat or as a primer coat, with a topcoat that does not contain zinc, and is reinforced by the addition of fibers and/or by a foaming agent which renders it porous. Stated applications for this coating include high tensile stress steel, such as coil springs.

U.S. Pat. No. 4,804,581 discloses a metal substrate coated with an elastomer-modified epoxy-containing coating primer and a carboxyl-functional material, such as a carboxyl-functional polyester resin, as a top-coat. The coating composition is said to be useful in automotive applications to provide desired anti-chip protection, but the examples show use on grounded steel panels, not highly stressed steel items, such as springs.

For the protection of high tensile strength springs, earlier coating systems used most preferably a combination of a zinc-rich epoxy thermoset primer for exceptional corrosion resistance with an overlying coating of a thermoplastic topcoat applied at a high film thickness to provide superior chip resistance (U.S. Pat. No. 5,981,086). In some cases, epoxy electrocoat was substituted for the zinc-rich primer.

Although typically poorer in chip resistance and cold temperature physical properties, U.S. Pat. No. 7,018,716 reports an epoxy thermoset topcoat with competing performance to the thermoplastic topcoat at reduced cost. Changes in the marketplace with respect to increased demand for zinc metal and associated higher prices have made zinc containing coatings less attractive. The applied cost of zinc containing coatings has also been also hurt by their relatively high density which equates to higher material usage in relation to area coated. Accordingly, there is a need for substantially non-zinc containing coatings for applications such as highly stressed steel.

SUMMARY OF THE INVENTION

The present invention relates to corrosion and chip resistant dual-coat powder coating systems, in which a substantially non-zinc containing epoxy thermoset primer primarily provides for corrosion resistance and an overlying epoxy-polyester thermoset topcoat primarily provides for chip resistance. In some embodiments, the coating systems are useful for high tensile steel alloys such as automotive suspension springs.

In one embodiment of the invention, a coating composition is disclosed comprising:
(I) an epoxy thermoset primer comprising:
(i) an epoxy resin having an EEW of about 860 to about 930;
(ii) a polyhydroxyl functional phenolic curing agent having a hydroxyl equivalent weight of about 200 to about 500; and
(iii) a filler material,
wherein said epoxy thermoset primer is substantially zinc-free, and
(II) an overlying epoxy-polyester thermoset topcoat comprising:
(i) an epoxy resin having an EEW of about 520 to about 930;
(ii) an elastomer-modified epoxy resin having an EEW of about 1000 to about 1600;
(iii) a carboxyl functional polyester resin with acid number of about 45 to about 75 mg KOH/g;
(iv) a foaming agent; and
(v) a reinforcing fiber.

Other embodiments of the invention include methods for applying coating compositions to high tensile steel alloys, and high tensile steel alloys such as springs coated with the compositions. It is further contemplated that some embodiments of the invention include a coating composition comprising an epoxy thermoset primer having the composition described above, without a topcoat.

DETAILED DESCRIPTION OF THE INVENTION

As used in the afore-discussed embodiments and other embodiments of the disclosure and claims described herein, the following terms generally have the meaning as indicated, but these meanings are not meant to limit the scope of the invention if the benefit of the invention is achieved by inferring a broader meaning to the following terms.

Other than in the operating examples, or where otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements. Unless stated otherwise, all percentages, ratios and proportions herein are by weight and particularly unless otherwise specifically stated, the proportions of the components in the compositions described are given in percentage pertaining to the total mass of the mixture of these components.

Also herein, the recitations of numerical ranges by endpoints include all numbers subsumed within that range (e.g., 1 to 5 includes 1, 1.5, 2, 2.75, 3, 3.80, 4, 5, etc.).

Also herein, "a," "an," "the", "at least one", and "one or more" are used interchangeably.

Also herein, the term "comprises" and variations thereof do not have a limiting meaning where these terms appear in the description and claims.

The terms "for example" and the like, as well as the exemplary compounds, ranges, parameters and the like disclosed throughout the application and claims are intended to identify embodiments of the invention in a non-limiting manner. Other compounds, ranges, parameters and the like can be employed by those skilled in the art without departing from the spirit and scope of the invention.

Driven by design considerations and lighter weight components to aid in fuel economy, automobile manufacturers are increasingly employing lighter weight, high tensile strength suspension springs in their vehicle designs. These springs with their lower metal mass achieve the strength of more massive springs through a combination of the specific steel alloy used in conjunction with other processing aspects.

Offsetting some of the advantages, the highly engineered properties of these springs are achieved at some cost in terms of their overall potential for breakage. Typically, since such springs are much harder and operate with much higher internal stresses, relatively little metal mass loss produced by corrosion pitting for example can cause spring breakage. Since vehicle suspensions can be subjected to extremely corrosive environments, particularly in northerly climates with the use of various road salts, protective coatings with exceptional chip resistance to flying gravel and corrosion resistance must be used to thoroughly protect high tensile strength springs.

Conventional powder coating systems include primers which typically contain zinc in amounts in excess of 50 wt % in order to provide corrosion resistance. The primers of the present invention satisfy the corrosion and chip resistance standards of the automotive industry, yet the primers are substantially non-zinc containing primers. As used herein, the terms "substantially non-zinc containing", "substantially zinc-free" and variations thereof describe primers containing no zinc, or primers containing zinc in an amount of less than about 50 wt %. The topcoats of the invention may contain zinc, may be "substantially non-zinc containing", or may be "substantially zinc-free".

Although the use of substantially non-zinc containing primers and topcoats fulfills a need in terms of lower cost protective coatings for highly stressed steel and particularly high tensile strength suspension springs, discrete primers and topcoats may be selected due to the somewhat contrary properties of corrosion resistance and chip resistance. Those primers and topcoats which possess good corrosion resistance do not always have the best chip resistance and vice versa.

One of the main functions of the non-zinc containing primers of the present invention which may be applied over zinc phosphate pretreated steel is to provide corrosion resistance. In addition, some measure of chip resistance may also be provided by the primer to accommodate those cases where less than ideal topcoat thickness is used. Accordingly, the primers of the present invention provide corrosion and chip resistance by containing an epoxy resin having an epoxy equivalent weight (EEW) of about 860 to about 930, a polyhydroxyl functional phenolic curing agent having a hydroxyl equivalent weight (HEW) of about 200 to about 500, and a filler material.

As used herein and further illustrated in the examples, the term "an effective amount" of an epoxy resin, an "effective amount" of a polyhydroxyl functional phenolic curing agent, and an "effective amount" of a filler material respectively describe amounts of epoxy resin, polyhydroxyl functional phenolic curing agent and filler material that contribute to a primer which satisfies industrially acceptable corrosion resistance standards for the intended application, such as in the case of high tensile suspension springs GM specification GMW14656.

Some embodiments of the invention employ an effective amount of an epoxy resin for use in the primers of the present invention including, for non-limiting example, epoxy resins based on 2,2-bis-(4-hydroxyphenol)-propane with softening points of between about 80° C. and about 125° C. and an epoxy equivalent weight of between about 450 and about 1,400, or in the alternative between about 860 and about 1,400. For non-limiting example, the softening point is between about 90° C. and about 115° C. and the epoxy equivalent weight is between about 860 to about 930. The epoxy resin may be chosen from a variety of epoxy resins useful for coating powders, such as, without limitation, those produced by the reaction of epichlorohydrin or polyglycidyl ether and an aromatic polyol such as, without limitation, bisphenol, e.g., bisphenol A. The epoxy resin may have an epoxy functionality greater than 1.0, and alternatively greater than 1.9.

Such epoxy resins may be produced, for non-limiting example, by an etherificiation reaction between an aromatic or aliphatic polyol and epichlorohydrin or dichlorohydrin in the presence of an alkali such as, without limitation, caustic soda. The aromatic polyol may be, for non-limiting example, bis(4-hydroxyphenyl)-2,2-propane (i.e. bisphenol A), bis(4-hydroxyphenyl)-1,1-ethane, bis(4-hydroxyphenyl)-1,1-isobutane, bis(4-hydroxy-t-butylphenyl)-2,2-propane, bis(2-hydroxynaphthyl)methane, 4,4'-dihydroxybenzophenone or 1,5-pentanediol, 1,6-hexanediol, diethylene glycol, triethylene glycol, polyethylene glycol, polypropylene glycol, dipropylene glycol, a diglycidyl ether or a condensed glycidyl ether of a diol. Oxirane group-containing polymers that can be used as the epoxy resin in primers according to this invention include, without limitation, polyglycidyl-functional acrylic polymers or epoxy novolac resins.

Other epoxy resins for use in the primer include, for non-limiting example, epoxidized phenol-novolac resins with a softening point between about 80° C. and about 125° C. In some embodiments, the softening point is between about 90° C. and about 115° C. In some embodiments, a diglycidyl ether of bisphenol-A (DGEBA) novolac modified epoxy resin is used.

In some embodiments of the invention, the bisphenol A epoxy resin is obtained, for non-limiting example, from condensation polymerization of bisphenol A with epichlorohydrin. Other resin chemistries such as, without limitation, bisphenol A resin cured with dicyandiamine or co-reacted with carboxy functional polyester (hybrid) produce a primer that is generally poorer in chip and/or corrosion resistance. For example, the table below entitled "Primer Examples Test Data & Comparatives" shows the poorer performance of Primer Comparative Examples 6 through 8 having dicyandiamine cured epoxy and/or hybrid resin chemistries.

The amount of the epoxy resin or combination of epoxy resins in the primer may vary in relation to the amounts of the additives and filler. For non-limiting example, per the phr (parts per hundred resin) formula convention, the resin and curing agent total is set at 100 parts. The percent of the total epoxy resin in the formulation then varies as a function of additives and filler phr level. In some embodiments, the epoxy resin or combination of epoxy resins is present in an amount from about 60 to about 95 parts of the available 100 parts.

In some embodiments of the invention, the primer contains an effective amount of, for non-limiting example, a polyhydroxyl phenolic curing agent, a polyhydroxyl phenolic curing agent containing 2-methylimidazole, a dicyandiamine curing agent, an accelerated dicyandiamine curing agent, imidazole derivatives, imidazoline derivatives, acid anhydrides of trimetallic acid, pyromellitic acid, benzophenonetetracarboxylic acid, tetrahydrophthalic acid, cyclopentanedicarboxylic acid, hexahydrophthalic acid, partly esterified adducts of carboxylic acids, aromatic amines, epoxy resin-phenol adducts, or combinations thereof. In some embodiments, the polyhydroxyl functional phenolic curing agent can have a hydroxyl equivalent weight (HEW) of from about 200 to about 500, and can be formed from bisphenol A termination of low molecular weight diglycidyl ethers of bisphenol A.

The amount of the curing agent or combination of curing agents may vary in relation to the amounts of the additive and filler. For non-limiting example, per the phr (parts per hundred resin) formula convention, the resin and curing agent total is set at 100 parts. The percent of the total curing agent in the formulation then varies as a function of additive and filler phr level. In some embodiments, the curing agent or combination of curing agents is present in an amount from about 5 to 40 parts of the available 100 parts.

The primers of the present also include an effective amount of a corrosion inhibitive filler material. Filler materials for use in the present invention include, for non-limiting example, complex aluminosilicate (muscovite mica), calcium metasilicate (wollastonite), micronized magnesium silicate (talc), zinc oxide powder, zinc dust, quartz powder, aluminum silicates, calcium silicates, magnesium silicates, calcium carbonate, barium sulphate, calcium sulphate, aluminum oxide, and combinations thereof.

Some embodiments of the invention employ a 10-35 μm median particle size (largest dimension) complex aluminosilicate (muscovite mica), a 2-6 μm median particle size (largest dimension) calcium metasilicate (wollastonite), or a 0.5-3.0 μm median particle size (largest dimension) micronized magnesium silicate (talc). The fillers function to improve corrosion resistance through a combination of barrier, pH regulation and moisture absorption properties. The wollastonite and mica are used in some embodiments at 10-30 phr (parts per hundred of resin) and the talc at 1-5 phr.

In some embodiments, the topcoat includes an effective amount of an epoxy resin having an EEW of about 520 to about 930. As used herein, the term "an effective amount" of an epoxy resin, an "effective amount" of an elastomer-modified epoxy resin, an "effective amount" of a carboxyl functional polyester resin, an "effective amount" of a foaming agent, and an "effective amount" of a reinforcing fiber respectively describe an amount of epoxy resin, elastomer-modified epoxy resin, carboxyl functional polyester resin, foaming agent, and reinforcing fiber that contribute to a topcoat which satisfies industrially acceptable standards for the intended application, such as in the case of high tensile suspension springs, GM specification GMW14656. Non-limiting examples of epoxy resins for use in the topcoat include epoxy resins based on 2,2-bis-(4-hydroxyphenol)-propane with softening points of between about 80° C. and about 125° C.

The amount of the epoxy resin or combination of epoxy resins in the topcoat may vary in relation to the amounts of the additive and reinforcing fiber. For non-limiting example, per the phr (parts per hundred resin) formula convention, the epoxy resin, the elastomer-modified epoxy resin and the carboxyl functional polyester resin total is set at 100 parts. The percent of the total epoxy resin in the formulation then varies as a function of additive and reinforcing fiber phr level. In some embodiments, the epoxy resin or combination of epoxy resins is present in an amount from about 30 to 65 parts of the available 100 parts.

The epoxy resin may be chosen from a variety of epoxy resins useful for coating powders, such as, without limitation, those produced by the reaction of epichlorohydrin or polyglycidyl ether and an aromatic polyol such as, without limitation, bisphenol, e.g., bisphenol A. The epoxy resin may have an epoxy functionality greater than 1.0, and alternatively greater than 1.9. Generally, the epoxy equivalent weight may be from about 450 to about 1400, and alternatively from about 520 to about 930.

Epoxy resins may be produced, for non-limiting example, by an etherificiation reaction between an aromatic or aliphatic polyol and epichlorohydrin or dichlorohydrin in the presence of an alkali such as, without limitation, caustic soda. The aromatic polyol may be, for non-limiting example, bis(4-hydroxyphenyl)-2,2-propane (i.e. bisphenol A), bis(4-hydroxyphenyl)-1,1-ethane, bis(4-hydroxyphenyl)-1,1-isobutane, bis(4-hydroxy-t-butylphenyl)-2,2-propane, bis(2-hydroxynaphthyl)methane, 4,4'-dihydroxybenzophenone or 1,5-pentanediol, 1,6-hexanediol, diethylene glycol, triethylene glycol, polyethylene glycol, polypropylene glycol, dipropylene glycol, a diglycidyl ether or a condensed glycidyl ether of a diol. Oxirane group-containing polymers that can be used as the epoxy resin in the topcoats according to this invention include, without limitation, polyglycidyl-functional acrylic polymers or epoxy novolac resins. In some embodiments, a diglycidyl ether of bisphenol-A (DGEBA) novolac modified epoxy resin is used.

The topcoat includes an effective amount of an elastomer-modified epoxy resin having an EEW of about 1000 to about 1600. In some embodiments of the invention, the elastomer-modified epoxy resin is a bisphenol A epoxy resin which has been adducted with CTBN (carboxyl terminated butadiene acrylonitrile) rubber producing a composite resin with an EEW of about 1000 to about 1600 g/eq. In some embodiments, the Tg is about 30 to about 50° C. Tg is the Glass Transition Temperature which is the critical temperature at which a non-crystalline material changes its behavior from a 'glassy' to 'rubbery' state. 'Glassy' in this context means hard and brittle (and therefore relatively easy to break), while 'rubbery' means elastic and flexible.

The amount of the elastomer-modified epoxy resin or combination of elastomer-modified epoxy resins in the topcoat may vary in relation to the amounts of the additive and reinforcing fiber. For non-limiting example, per the phr (parts per hundred resin) formula convention, the epoxy resin, the elastomer-modified epoxy resin and the carboxyl functional polyester resin total is set at 100 parts. The percent of the total elastomer-modified epoxy resin in the formulation then varies as a function of additive and reinforcing fiber phr level. In some embodiments, the elastomer-modified epoxy resin or combination of elastomer-modified epoxy resins is present in an amount from about 5 to 20 parts of the available 100 parts.

The topcoat also includes an effective amount of a carboxy functional polyester resin with an acid number of about 45 to about 75 mg KOH/g. In some embodiments of the invention, the acid number is from about 50 to about 60 mg KOH/g for enhanced chip resistance.

The amount of the carboxy functional polyester resin or combination of carboxy functional polyester resins in the topcoat may vary in relation to the amounts of the additive and reinforcing fiber. For non-limiting example, per the phr (parts per hundred resin) formula convention, the epoxy resin, the elastomer-modified epoxy resin and the carboxyl functional polyester resin total is set at 100 parts. The percent of the total carboxy functional polyester resin in the formulation then varies as a function of additive and reinforcing fiber phr level. In some embodiments, the carboxy functional polyester resin or combination of carboxy functional polyester resins is present in an amount from about 45 to 70 parts of the available 100 parts.

The carboxyl-functional polyester resins can be prepared by any commonly known method, such as for non-limiting example, condensation reactions between aliphatic di- or poly-hydric alcohols and cycloaliphatic, acyclic or aliphatic di- or poly-carboxylic acids or anhydrides thereof, or between aliphatic dihydric alcohols and aromatic di- or poly-carboxylic acids or anhydrides thereof. For non-limiting example, the carboxyl-functional polyester resins can be prepared from aliphatic di- or poly-hydric alcohols, particularly lower aliphatic diols such as, without limitation, ethylene glycol, 1,2-propane diol, 1,3-propane diol, 1,2-butanediol, 1,3-butanediol, 1,4-butanediol, 2,2-dimethyl propane-1,3-diol (i.e., neopentyl glycol), 1,6-hexanediol, 2,3-hexanediol, 2,5-hexanediol, diethylene glycol or dipropylene glycol. Polyols such as, without limitation, trimethylolpropane or the like can also be used to prepare the carboxyl-functional polyesters. Examples of suitable di- or poly-carboxylic acids and anhydrides include, without limitation, phthalic acid, isophthalic acid, terephthalic acid, malonic acid, succinic acid, glutaric acid, adipic acid, pimelic acid, suberic acid, azelaic acid, sebacic acid, dodecanedioic acid, tetrahydrophthalic acid, hexahydrophthalic acid, and maleic acid and anhydrides of such acids. In some embodiments, the carboxyl-functional polyester resin is an aromatic containing polyester, for non-limiting example, a polyester prepared from aromatic carboxylic acid such as, without limitation, phthalic acid, isophthalic acid or terephthalic acid and a polyol such as, without limitation, neopentyl glycol.

An effective amount of a foaming/blowing agent additive is present in the topcoat to establish a porous structure within the coating film. The porous structure imparts physical properties to the coating such as the ability to absorb impact energy without fracturing.

In particular embodiments of the invention, commercially desirable porosity for high tensile suspension springs is achieved when the cured topcoat exhibits a 20-50% reduction in density from that of the theoretical topcoat density without porosity. In some embodiments, the foaming and blowing agents are used at about 0.5 to about 2.0 phr (parts per hundred of resin). Foaming agents with p,p'-oxybis(benzenesulfonylhydrazide) and activated azodicarbonamide based compositions are employed in some embodiments. Other foaming agents include, without limitation, p-toluenesulfonylhydrazide based foaming agents An effective amount of a reinforcing fiber is present in the topcoat to recover any loss of strength caused by the presence of a foaming/blowing agent. For non-limiting example, a range of aluminosilicate glass fibers or natural mined calcium metasilicate (wollastonite) fibers can be employed. An average diameter of about 3 to about 15 um and an average aspect ratio (within the context of coatings fillers, aspect ratio is defined as the ratio of a filler particle's largest dimension to its smallest) of about 5 to about 20 can be employed in some embodiments. Other reinforcing fibers such as, without limitation, aramid and carbon could be used as well. Reinforcing fibers in the amount of about 20 to about 70 phr are employed in some embodiments of the invention.

The primers and topcoats can also include additives, such as, without limitation, pigments, catalysts/curing agents, degassing agents, and flow control agents.

Pigments for use in the primer and topcoat compositions of the invention include, for non-limiting example, titanium dioxide, iron oxide (yellow, brown, red, black), carbon black and organic pigments. These pigments can be added in conventional amounts known to those in the art.

Catalysts/curing agents for use in the present invention include, for non-limiting example, quaternary ammonium salts, quaternary phosphonium salts, phosphines, imidazoles and metal salts. Examples include, without limitation, tetrabutylammonium chloride, tetrabutylammonium bromide or tetrabutylammonium iodide, ethyltriphenyl phosphonium acetate, triphenylphosphine, 2-methyl imidazole and dibutyltin dilaurate. The catalyst, when used in some embodiments, is present in the composition in amounts of between 0 and about 5 weight percent, and alternatively from about 0.2 to about 2 percent by weight based on total weight of the coating composition.

A degassing agent can be added to the composition to allow any volatile material present to escape from the film during baking. Benzoin is a degassing agent and when used in some embodiments can be present in amounts from about 0.5 to about 3.0 percent by weight based on total weight of a powder coating composition.

Flow control agents include, without limitation, lower molecular weight acrylic polymers, for non-limiting example, acrylic polymers, such as without limitation acrylic polymers having a number average molecular weight from about 1000 to 50,000, such as, without limitation, polylauryl acrylate, polybutyl acrylate, poly(2-ethylhexyl)acrylate, poly(ethylacrylate-2-ethylhexylacrylate), polylauryl methacrylate and polyisodecyl methacrylate, and fluorinated polymers such as, without limitation, the esters of polyethylene glycol or polypropylene glycol and fluorinated fatty acids. Polymeric siloxanes of molecular weights over 1,000 may also be used as a flow control agent, for non-limiting example, poly(dimethylsiloxane) or poly(methylphenyl) siloxane. Flow control agents can aid in the reduction of surface tension during heating of the coating powder and in elimination of crater formation. In some embodiments, the flow control agent when used is present in amounts of from about 0.05 to 5.0 percent by weight based on the total weight of a powder coating composition.

The coating compositions of the present invention are especially suitable for application to metals, such as, without limitation, automotive springs. However, it is also possible to apply the coating compositions to carbon, wood, glass, polymers and other substrates.

Application of the above described primer and topcoat compositions to high tensile steel can be accomplished by any known techniques, such as, without limitation, the following Methods 1 through 3. Regardless of the application technique used, the composite coating (primer & topcoat) formed on the high tensile steel alloy may contain a discrete primer, for non-limiting example from about 1.5 to about 4.0 mils thick, in contact with the pretreated steel surface. The topcoat of the composite coating may also form a discrete topcoat, for non-limiting example from about 10 to about 35 mils thick, which is bonded to the underlying primer layer. The coating composition may also be applied with a primer and without a topcoat.

Application Techniques
1. Method 1—The steel is heated to about 220 to about 380° F. for more ideal deposition followed by successive application of the primer and topcoat. The coated steel is then heated again to create a composite coating layer and achieve full property development on the coating system.
2. Method 2—The primer is applied to ambient temperature high tensile steel alloy followed by heating to about 220 to about 380° F. to fuse or partially cure the coating. The topcoat is applied to the hot steel using ideally residual heat remaining from the primer heating. The coated steel is then heated again to create a composite layer and achieve full property development on the coating system.
3. Method 3—The primer and topcoat are applied successively to ambient temperature high tensile steel in a "dry on dry" powder fashion followed by a single heat cycle of about 220 to about 380° F. to create a composite coating layer and achieve full property development on the coating system.

EXAMPLES

The invention will be further described by reference to the following non-limiting examples. It should be understood that variations and modifications of these examples can be made by those skilled in the art without departing from the spirit and scope of the invention.

Eight primer and topcoat compositions were prepared in accordance with the above Method 1 from the following mixtures of ingredients:

Primer Compositions

| Component | Primer Examples | | | | | | | |
|---|---|---|---|---|---|---|---|---|
| | Comp 1 | 2 | 3 | 4 | 5 | Comp 6 | Comp 7 | Comp 8 |
| Bisphenol A Epoxy Resin A[1] | 75.14 | 73.24 | 71.72 | 71.17 | 55.42 | | | |
| Bisphenol A Epoxy Resin B[1] | | | | | | 86.33 | 29.13 | 83.19 |
| Bisphenol A Epoxy Resin C[1] | | | | | 16.30 | | | |
| Bisphenol A Epoxy Resin D[1] (Contains Acronal 4F Flow Modifier) | 8.56 | 10.46 | 11.98 | 12.53 | 11.98 | 13.70 | 12.08 | 16.81 |
| Carboxyl Polyester Resin A[2] | | | | | | | 58.79 | |
| Phenolic Curing Agent[3] (Contains 2-Methylimidazole) | 16.30 | 16.30 | 16.30 | 16.30 | 16.30 | | | |
| Casamid 710[4] | | | | | | | | |
| Epikure P-108[5] | | | | | | 5.00 | | 5.45 |
| 2-Methylimidazole | | | | | | | 0.38 | |
| Benzoin[6] | 0.36 | 0.44 | 0.51 | 0.53 | 0.51 | 0.53 | 0.53 | |
| Black Pearls 800[7] | 0.31 | 0.38 | 0.44 | 0.46 | 0.44 | 0.46 | 0.46 | |
| Tiona 595t[8] | 3.12 | 3.80 | 4.36 | 4.56 | 4.36 | 4..56 | | 7.64 |
| Muscovite Mica Filler[9] | | 22.20 | 25.42 | 26.58 | 25.42 | | 26.69 | |
| Calcium Metasilicate (Wollastonite) Filler[10] | | | 14.52 | 15.19 | 14.52 | 41.77 | 15.24 | |
| K-White TC720[11] | | | | 4.56 | | 4.56 | 4.57 | |
| AZO77H[12] | | | | | | | 29.13 | 9.17 |
| Zinc Dust 64[13] | | | | | | | | 183.39 |
| Weight Totals | 103.79 | 126.82 | 145.25 | 151.88 | 145.25 | 151.88 | 152.44 | 305.65 |

[1]Bisphenol A epoxy resins A, B, C and D have EEW of 860-930, 730-820, 1250-1400, and 780-900 respectively and are commercially available from The Dow Chemical Company.
[2]Carboxyl functional polyester resin with acid number of 46-51 mg KOH/g and Tg of ~50° C. commercially available from Cytec Industries Inc.
[3]Phenolic curing agent with HEW of 240-270 and containing 2% 28-Methylimidazole cure accelerator commercially available from The Dow Chemical Company.
[4]Casamid 710 is a substituted dicyandiamine curing agent commercially available from the Thomas Swan & Co., Ltd.
[5]Epikure P-108 is an accelerated dicyandiamine commercially available from Hexion Speciality Chemicals.
[6]Benzoin is a degassing agent commercially available from Aceto Corporation.
[7]Black Pearls 800 is a carbon black pigment commercially available from Cabot Corporation.
[8]Tiona 595 is a titanium dioxide pigment commercially available form Millennium Chemicals.
[9]Muscovite mica filler with average median particle size of 20 um commercially available from Fibertec, Inc.
[10]Calcium metasilicate (wollastonite) filler with 3.5um median particle size and aspect ratio of 3 commercially available NYCO Minerals.
[11]K-White TC720 is a magnesium silicate (talc) anti-corrosive pigment commercially available from the Tayca Corporation.
[12]AZO77H is a zinc oxide pigment commercially available from U.S. Zinc.
[13]Zinc dust 64 is zinc powder manufactured by Zinc Corporation of America and distributed through The Cary Company.

Topcoat Compositions

| Component | Topcoat Examples | | | | | | | |
|---|---|---|---|---|---|---|---|---|
| | Comp 1 | Comp 2 | Comp 3 | Comp 4 | Comp 5 | 6 | 7 | 8 |
| Bisphenol A Epoxy Resin E[1] | 50.00 | 40.00 | | | | | | |
| Bisphenol A Epoxy Resin F[1] | | | 45.00 | | | | | |
| Bisphenol A Epoxy Resin G[1] | | | | 30.00 | 30.00 | 30.00 | 30.00 | 30.00 |
| CTBN Modified Bisphenol A Epoxy[2] | | | | 10.00 | 10.00 | 10.00 | 10.00 | 10.00 |
| Carboxyl Polyester Resin A[3] | 50.00 | | | | | | | |
| Carboxyl Polyester Resin B[4] | | 60.00 | 55.00 | 60.00 | 60.00 | 60.00 | 60.00 | 60.00 |
| Benzyltriethylammonium chloride | 0.35 | 0.48 | 0.48 | 0.41 | 0.45 | 0.49 | 0.49 | 0.49 |
| Bentone 38[5] | 0.69 | 0.69 | 0.69 | 0.69 | 0.75 | 0.81 | 0.81 | 0.81 |
| Lanco TF1778[6] | 1.10 | 1.11 | 1.11 | 1.11 | 1.20 | 1.30 | 1.30 | 1.30 |
| p,p'-oxybis(benzenesulfonylhydrazide) Foaming Agent[7] | | | | | 1.13 | 1.22 | 1.22 | |
| Azodicarbonamide Foaming Agent[8] | | | | | | | | 1.05 |
| Black Pearls 800 | 1.38 | 1.38 | 1.38 | 1.38 | 1.50 | 1.62 | 1.62 | 1.62 |
| Calcium Metasilicate (Wollastonite) Fibers[9] | | | | | | 48.66 | | 48.58 |
| Aluminosilicate Fibers[10] | | | | | | | 48.66 | |
| Atomite[11] | 34.51 | 34.56 | 34.56 | 34.53 | 45.00 | 8.11 | 8.11 | 8.10 |
| Weight Totals | 138.03 | 138.22 | 138.22 | 138.12 | 150.03 | 162.21 | 162.21 | 161.95 |
| Theoretical Coating Density(g/cm$^3$) | N/A | N/A | N/A | N/A | 1.45 | 1.53 | 1.50 | 1.52 |
| Porous Coating Density(g/cm$^3$) | N/A | N/A | N/A | N/A | 0.98 | 1.10 | 0.95 | 0.92 |
| % Density Reduction | N/A | N/A | N/A | N/A | 32.40 | 28.10 | 36.7 | 39.5 |

[1]Bisphenol A epoxy resins E, F and G have EEW of 730-820, 860-930, and 520-560 respectively and are commercially available from The Dow Chemical Company.
[2]CTBN modified epoxy resin with EEW of 1250-1500 commercially available from CVC Specialty Chemicals, Inc.
[3]Carboxyl functional polyester resin with acid number of 46-51 mg KOH/g and Tg of ~50° C. commercially available from Cytec Industries Inc.
[4]Carboxyl functional polyester resin with acid number of 68-74 mg KOH/g and Tg of ~58° C. commercially available from Cytec Industries Inc.
[5]Bentone 38 is an organoclay rheological modifier commercially available from Elementis Specialties.
[6]Lanco TF1778 is a polyethylene/PTFE based wax commercially available from Lubrizol Advanced Materials, Inc.
[7]The p,p'-oxybis(benzenesulfonylhydrazide) foaming agent has a decomposition point of 320° F. with a gas yield of 125 cc/g and is commercially available through Chemtura Corporation.
[8]The azodicarbonamide foaming agent has decomposition point of 329-356° F. with a gas yield of 180 cc/g and is commercially available through Chemtura Corporation.
[9]The calcium metasilicate (wollastonite) fibers have an average particle size of 3um with an aspect ratio of 9 and are commercially available through Fibertec, Inc.
[10]The aluminosilicate fibers are silane treated and have an average length of 125 ± 25 um and are commercially available form Lapinus Fibers.
[11]Atomite is a calcium carbonate filler commercially available from Imerys Performance Minerals.

Primer Examples Test Data & Comparatives

| | 30 Cycles SAE J2334 Cyclic Corrosion (Creep) | | | SAE J400 Chip Resistance |
|---|---|---|---|---|
| Primer Example | Min. (mm) | Max. (mm) | Avg. (mm) | Method B - (Rating) |
| Comp. 1 (non-zinc) | 4 | 6 | 5.3 | 8A |
| 2 (non-zinc) | 1 | 3 | 2.4 | 8A |
| 3 (non-zinc) | 0 | 2 | 1.3 | 8A |
| 4 (non-zinc) | 0 | 1 | 0.4 | 8A |
| 5 (non-zinc) | 1 | 3 | 1.9 | 8A |
| Comp. 6 (non-zinc) | 2 | 5 | 3.9 | 8B |
| Comp. 7 (zinc) | 2 | 4 | 3.2 | 7B |
| Comp. 8 (zinc) | 0 | 2 | 1.4 | 9B |

The above table demonstrates that the performance of the substantially non-zinc containing primers of the present invention was found to match or exceed the performance of conventional zinc-containing primers.

Topcoat Examples Test Data
With Primer Example 4

*Testing to Ford specification WSS-M2P177-B1 for high tensile suspension springs which allows no chipping of coating to metal on SAE J400. The chip rating must be a 10.

| Topcoat Example | SAE J400 Chip Resistance - Method B | | |
|---|---|---|---|
| | Rating | Failure Point | Pass/Fail |
| Comp. 1 | 8C | Substrate to Primer | Fail |
| Comp. 2 | 8B | Substrate to Primer | Fail |
| Comp. 3 | 8B | Substrate to Primer | Fail |
| Comp. 4 | 8A-8B | Substrate to Primer | Fail |
| Comp. 5 | 8A | Substrate to Primer | Fail |
| 6 | 10 | N/A | Pass |
| 7 | 10 | N/A | Pass |
| 8 | 10 | N/A | Pass |

Substrate: Zinc phosphate pretreated steel panels formed to simulate suspension springs
Primer: Example 4 (2.5-3.0 mils)
Dual-coat Film Thickness: 15.0-20.0 mils GM Cyclic Corrosion (GMW14782) & GM Impact Resistance (GMW14700)
Test Procedure: GMW14782 (Method B)
Evaluation Procedure: GM 15282 (Method A)
Requirements: 6 mm maximum average creepback and no chipping greater than 3 mm

| Primer Example (with Topcoat 6) | Impact Resistance GMW 14700 | GMW14782 (Method B) Maximum Avg. Creepback (mm) | Pass/Fail |
|---|---|---|---|
| Comp. 1 | No Chipping | Total Adhesion Loss | Fail |
| 2 | No Chipping | 4.6 | Pass |
| 3 | No Chipping | 2.4 | Pass |
| 4 | No Chipping | 1.6 | Pass |
| 5 | No Chipping | 3.9 | Pass |

I claim:

1. A dual-coat powder coating system comprising:
   (I) an epoxy thermoset primer comprising:
      (i) an epoxy resin having an EEW of about 860 to about 930;
      (ii) a polyhydroxyl functional phenolic curing agent having a hydroxyl equivalent weight of about 200 to about 500; and
      (iii) a filler material,
      wherein said epoxy thermoset primer is substantially zinc-free, and
   (II) an overlying epoxy-polyester thermoset topcoat comprising:
      (i) an epoxy resin having an EEW of about 520 to about 930;
      (ii) an elastomer-modified epoxy resin having an EEW of about 1000 to about 1600;
      (iii) a carboxyl functional polyester resin with acid number of about 45 to about 75 mg KOH/g;
      (iv) a foaming agent; and
      (v) a reinforcing fiber.

2. The dual-coat powder coating system of claim 1, wherein the epoxy thermoset primer further comprises an effective amount of an epoxy resin having an EEW of about 1250 to about 1400.

3. The dual-coat powder coating system of claim 1, wherein said epoxy resin in said epoxy thermoset primer comprises a bisphenol A epoxy resin.

4. The dual-coat powder coating system of claim 1, wherein said epoxy resin in said epoxy thermoset primer is present in an amount from about 60 to about 95 phr.

5. The dual-coat powder coating system of claim 1, wherein said polyhydroxyl functional phenolic curing agent further comprises 2-methylimidazole.

6. The dual-coat powder coating system of claim 1, wherein said polyhydroxyl functional phenolic curing agent is present in an amount from about 5 to about 40 phr.

7. The dual-coat powder coating system of claim 1, wherein said filler material comprises complex aluminosilicate (mica), calcium metasilicate (wollastonite), micronized talc, zinc oxide powder, zinc dust, or a combination thereof.

8. The dual-coat powder coating system of claim 7, wherein said complex aluminosilicate (mica) is present in an amount from about 10 to about 30 phr and has a median particle size of from about 10 to about 35 microns.

9. The dual-coat powder coating system of claim 7, wherein said calcium metasilicate (wollastonite) is present in an amount from about 10 to about 30 phr and has a median particle size of from about 2 to about 6 microns.

10. The dual-coat powder coating system of claim 7, wherein said micronized talc is present in an amount from about 1 to about 5 phr and has a median particle size of from about 0.5 to about 3.0 microns.

11. The dual-coat powder coating system of claim 1, wherein said epoxy resin in said epoxy-polyester thermoset topcoat comprises a bisphenol A epoxy resin.

12. The dual-coat powder coating system of claim 1, wherein said epoxy resin in said epoxy polyester thermoset topcoat is present in an amount from about 30 to about 65 phr.

13. The dual-coat powder coating system claim 1, wherein said elastomer-modified epoxy resin comprises a bisphenol A epoxy resin.

14. The dual-coat powder coating system of claim 1, wherein said elastomer-modified epoxy resin is present in an amount from about 5 to about 20 phr.

15. The dual-coat powder coating system claim 1, wherein said carboxyl functional polyester resin is present in an amount from about 45 to about 70 phr.

16. The dual-coat powder coating system of claim 1, wherein said foaming agent imparts a 20-50% reduction in density in said topcoat from that of the theoretical coating density without porosity.

17. The dual-coat powder coating system of claim 1, wherein said foaming agent is present in an amount from about 0.5 to about 2.0 phr.

18. The dual-coat powder coating system of claim 1, wherein said reinforcing fiber comprises aluminosilicate, calcium metasilicate (wollastonite), aramid, carbon, or a combination thereof.

19. The dual-coat powder coating system of claim 1, wherein said reinforcing fiber is present in an amount from about 20 to about 70 phr.

20. The dual-coat powder coating system of claim 1, wherein said epoxy thermoset primer contains no zinc.

21. A high tensile steel alloy coated with a composite coating layer formed from the dual-coat powder coating system of claim 1.

* * * * *